No. 821,852. PATENTED MAY 29, 1906.
B. BROWER.
INK WELL.
APPLICATION FILED SEPT. 15, 1904.

Witnesses
Inventor
Bloomfield Brower
By his Attorneys

UNITED STATES PATENT OFFICE.

BLOOMFIELD BROWER, OF NEW YORK, N. Y.

INK-WELL.

No. 821,852.   Specification of Letters Patent.   Patented May 29, 1906.

Application filed September 15, 1904. Serial No. 224,484.

*To all whom it may concern:*

Be it known that I, BLOOMFIELD BROWER, a citizen of the United States, residing at New York, county of New York, and State of New York, have invented certain new and useful Improvements in Ink-Wells, fully described and represented in the following specification and the accompanying drawings, forming a part of the same.

This invention relates to improvements in ink-wells, and particularly those ink-wells which are provided with a float adapted to be depressed by a pen and when so depressed to displace the ink in which it floats and cause it to rise into contact with and ink the pen.

It is the object of the present invention to provide an ink-well of this class in which the amount of ink exposed to the atmosphere and consequent evaporation, collection of dust, &c., is reduced to the minimum, in which the liability of the ink squirting upwardly upon the depression of the float is entirely avoided, and in which the ink is caused to so circulate through the well and around or through the float that upon each depression of the float there will be presented to the pen not the same or part of the same ink left standing after the last preceding depression of the float, but fresh ink from the body of the well.

As a full understanding of the invention can best be had from a detailed description of an organization embodying the same, such description will now be given, reference being had to the accompanying drawings, in which—

Figure 1:
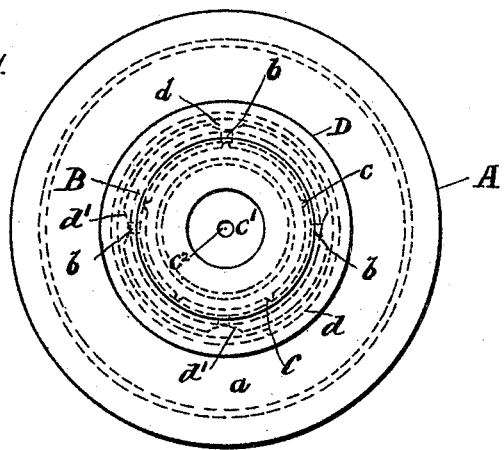
Figure 2:
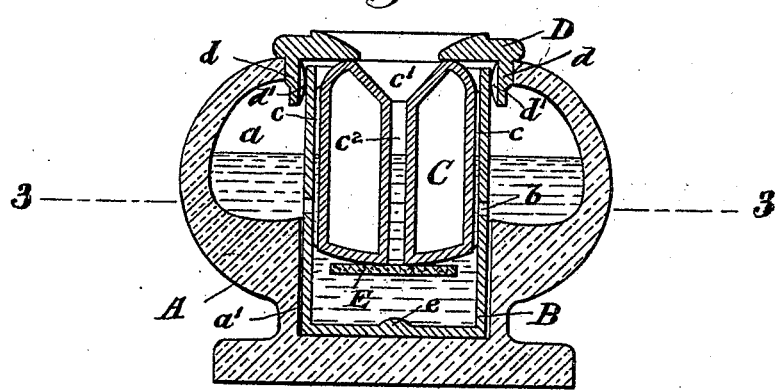
Figure 3:
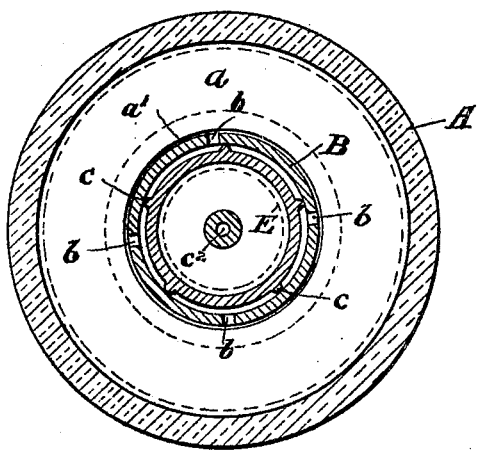

Figure 1 is a plan view of an ink-well embodying the present invention. Fig. 2 is a vertical section of the same, and Fig. 3 is a horizontal section on the line 3 of Fig. 2.

Referring to said drawings, A represents the ink-well proper, provided with a suitable ink-chamber *a* and with a supplemental chamber *a'* for the reception of a cup or what may be termed a "float-chamber" B. This float-chamber is in a lower plane than chamber *a* and is provided substantially in line with the bottom of said chamber *a* with side openings *b*, through which it communicates with and is supplied with ink from said chamber *a*. This float-chamber is preferably of hard vulcanized rubber; but it may be made of other suitable material, if desired. Within the float-chamber B is located a float C, also preferably of hard vulcanized rubber and of the hollow cylindrical form shown. The exterior diameter of this float is somewhat less than the interior diameter of the float-chamber B, so as to provide a space between the float and said chamber through which the ink in the chamber may rise and then pass over the top of the float when the latter is depressed by a pen and displaces the ink beneath it in said float-chamber. For the purpose of centering the float C in the float-chamber B vertical ribs *c* are interposed between the two, these ribs being preferably formed upon the float. The ink which is thus caused to rise between the float and float-chamber and to pass over the top of the float inks the pen which has depressed the float, and in order to insure a sufficient supply of ink about the pen at the top of the float to properly ink the pen the float C is provided at its top with a depressed portion or dipping-cup *c'*, into which the ink passes as it passes over the top of the float. The well is also provided with a cap D, preferably of hard vulcanized rubber, which is removable for the purpose of supplying the well with ink or to permit the removal of the float and float-chamber for cleaning or other purposes. This cap D is provided with a depending flange *d*, which makes a close fit in the opening provided in the well for its reception, so as to render the ink-well substantially air-tight and dust-proof at that point. The top edge of the float or its dipping-cup *c'* also, as will be observed, in the raised position of the float contacts with the under surface of the cap D, so that at this point the well is also substantially air-tight and dust-proof. The upper end of the float-chamber B does not contact directly with the inner surface of the flange *d*, but with projections *d'* on the flange, so that space is provided between the float-chamber and said flange for the passage into chamber *a* of part of the ink forced upwardly by the float and which does not enter the dripping-cup *c'*.

The float C is also provided with an ink-passage $c^2$, through which the dipping-cup *c'* communicates with the body of the float-chamber, the function of this passage being to provide for the return to the float-chamber of the ink which, on the depression of the float, passes over the sides of the float and into the dipping-cup *c'*. This ink-passage is controlled by a valve E, consisting, preferably, of a disk or cork floating freely in the float-chamber beneath the float C and normally in contact with the lower end thereof, so as to close the ink-passage $c^2$. The result of this construction is that while the float is in its uppermost position, as shown in Fig. 2, the float-valve E will rest against its lower end, thus closing the opening or passage $c^2$. While the float is being depressed by a pen, the float-valve E will still occupy this position with relation to the float, and thus prevent the entrance of ink from the float-chamber into said ink-passage $c^2$. When, however, the pen is withdrawn from contact with the upper end of the float and the latter then rises, the float C and float-valve E will become sufficiently separated by reason of the float rising in advance of the valve to open communication between passage $c^2$ and the float-chamber B, so that the ink in the former may pass therefrom into the float-chamber until the level of the ink in said passage $c^2$, the float-chamber B, and the chamber $a$ is equalized. Then the float-valve E resumes the closing position in which it is shown in Fig. 2. The bottom of the float-chamber B instead of presenting a flat surface for contact with the under side of valve E as the latter is forced downwardly by the float (which might result in the valve being held against the bottom of the float-chamber) is provided with an upward projection $e$, presenting a surface of small area for engaging the valve E, this arrangement facilitating the upward movement of valve E upon the upward movement of the float. A similar arrangement exists between the contacting surfaces of the float and valve for facilitating upward movement of the float away from the valve.

The float-valve E, although preferably provided and forming a feature of the invention, may be omitted without materially changing the function and operation of the other parts of the ink-well, as without such float-valve even though some ink may rise through the central passage $c^2$ when the float is depressed, yet the greater portion of the ink which rises to the top of the float when the latter is depressed will pass upward through the channel or space between the float and the float-chamber B and pass over the top of the float and into the dipping-cup $c'$. From this construction of ink-well, including float-valve E, there results the following important advantages. All possibility of the ink squirting upwardly out of the mouth of the well or onto the holder of the pen or the fingers of the writer is entirely avoided, as the pen is supplied with ink which passes upwardly around the float and not through a central opening therein, upward movement of ink from float-chamber B through opening or passage $c^2$ on the depression of the float being prevented by the valve E. Fresh ink and not the ink left standing since the last preceding depression of the float is presented to the pen, the ink so presented being not that in the ink-passage $c^2$, but that which passes upwardly from the float-chamber around the float and over its top into the dipping-cup $c'$ when the float is depressed, the ink left standing in the passage $c^2$ after each depression of the float being finally returned to the float-chamber. The ink-well is substantially air-tight and dust-proof, the only point at which the ink therein is exposed to the atmosphere being the ink-passage $c^2$, which, as will be observed, is of small diameter and the ink from which is, as just stated, returned to the float-chamber and mixed with the ink therein, so that any evil effect which may have been produced thereon by the atmosphere is corrected or dissipated by such mixture. Without the float-valve E the same advantages would result, though to a lesser degree.

The ink-well shown has other important advantages independent of the float-valve E. It is simple in construction. The float-chamber, float, and cap may be readily and quickly removed when it is desired to supply the well with ink or for any other purpose and as readily and quickly replaced in position thereon, and, finally, because of the provision of side openings above the bottom of the float-chamber in line substantially with the bottom of the ink-chamber $a$ insures the use of the ink-well with a comparatively small quantity of ink and also when the ink in chamber $a$ falls below the side openings results in the float falling, thus warning or notifying the user to refill the well with ink.

What I claim is—

1. The combination with an ink-chamber and a float-chamber supplied with ink therefrom, of an ink-displacing float in the float-chamber, the sides of the float being spaced from the walls of the float-chamber so that ink in the latter is caused to rise between the float and the walls of the float-chamber and pass over the top of the float when the latter is depressed by a pen, said float having an ink-passage for returning to the float-chamber the ink thus passing over the top of the float, and a valve controlling said ink-passage so as to permit such return of the ink but prevent entrance of the ink into the lower end of said passage as the float is depressed, substantially as described.

2. The combination with an ink-chamber and a float-chamber supplied with ink therefrom, of an ink-displacing float in the float-chamber, the sides of the float being spaced from the walls of the float-chamber so that ink in the latter is caused to rise between the float and the walls of the float-chamber and pass over the top of the float when the latter is depressed by a pen, said float having an ink-passage for returning to the float-chamber the ink thus passing over the top of the float, and a float-valve controlling said ink-passage so as to permit such return of the ink but prevent entrance of the ink into the lower end of said passage as the float is depressed, substantially as described.

3. The combination with an ink-chamber and a float-chamber supplied with ink therefrom, of an ink-displacing float in the float-chamber, the sides of the float being spaced from the walls of the float-chamber so that ink in the latter is caused to rise between the float and the walls of the float-chamber and pass over the top of the float when the latter is depressed by a pen, said float having an ink-passage for returning to the float-chamber the ink thus passing over the top of the float, and a disk-like float-valve controlling said ink-passage so as to permit such return of the ink but prevent entrance of the ink into the lower end of said passage as the float is depressed, substantially as described.

4. The combination with an ink-chamber and a float-chamber supplied with ink therefrom, of an ink-displacing float in the float-chamber, the sides of the float being spaced from the walls of the float-chamber so that ink in the latter is caused to rise between the float and the walls of the float-chamber and pass over the top of the float when the latter is depressed by a pen, a dipping-cup in the top of the float, said float having an ink-passage for returning to the float-chamber the ink thus passing over the top of the float, and a valve controlling said ink-passage so as to permit such return of the ink but prevent entrance of the ink into the lower end of said passage as the float is depressed, substantially as described.

5. The combination with an ink-chamber and a float-chamber having side openings through which it communicates with said ink-chamber, of an ink-displacing float in the float-chamber, the sides of the float being spaced from the walls of the float-chamber so that ink in the latter is caused to rise between the float and the walls of the float-chamber and pass over the top of the float when the latter is depressed by a pen, said float having an ink-passage for returning to the body of the float-chamber the ink thus passing over the top of the float, and a valve controlling said ink-passage so as to permit such return of the ink but prevent entrance of the ink into the lower end of said passage from the body of the float-chamber as the float is depressed, substantially as described.

6. The combination with an ink-chamber and a float-chamber having side openings through which it communicates with said ink-chamber, of an ink-displacing float in the float-chamber, the sides of the float being spaced from the walls of the float-chamber so that ink in the latter is caused to rise between the float and the walls of the float-chamber and pass over the top of the float when the latter is depressed by a pen, said float having an ink-passage for returning to the body of the float-chamber the ink thus passing over the top of the float, a valve controlling said ink-passage so as to permit such return of the ink but prevent entrance of the ink into the lower end of said passage from the body of the float-chamber as the float is depressed, and a cap having a substantially air-tight fit in the upper end of the well and with the under side of which the upper end of the float makes contact, substantially as described.

7. The combination with an ink-chamber and a float-chamber supplied with ink therefrom, of an ink-displacing float in the float-chamber, the sides of the float being spaced from the walls of the float-chamber so that ink in the latter is caused to rise between the float and the walls of the float-chamber and pass over the top of the float when the float is depressed by a pen, said float having an ink-passage, and said float-chamber having side openings through which ink is supplied to it from the ink-chamber, substantially as described.

8. The combination with an ink-chamber and a float-chamber located in a lower plane and supplied with ink therefrom, of an ink-displacing float in the float-chamber, the sides of the float being spaced from the walls of the float-chamber so that ink in the latter is caused to rise between the float and the walls of the float-chamber and pass over the top of the float when the float is depressed by a pen, said float having an ink-passage, and said float-chamber having side openings through which ink is supplied to it from the ink-chamber, substantially as described.

9. The combination with an ink-chamber and a float-chamber located in a lower plane and supplied with ink therefrom, of an ink-displacing float in the float-chamber, the sides of the float being spaced from the walls of the float-chamber so that ink in the latter is caused to rise between the float and the walls of the float-chamber and pass over the top of the float when the float is depressed by a pen, said float having an ink-passage, and said float-chamber having side openings substantially in line with the bottom of the ink-chamber through which ink is supplied to it from the ink-chamber, substantially as described.

In testimony whereof I have hereunto set my hand in the presence of two subscribing witnesses.

BLOOMFIELD BROWER.

Witnesses:
J. A. GRAVES,
G. M. BORST.